Feb. 25, 1930.  F. J. MILLER  1,748,578
HAND TRUCK
Filed May 31, 1928   2 Sheets-Sheet 1
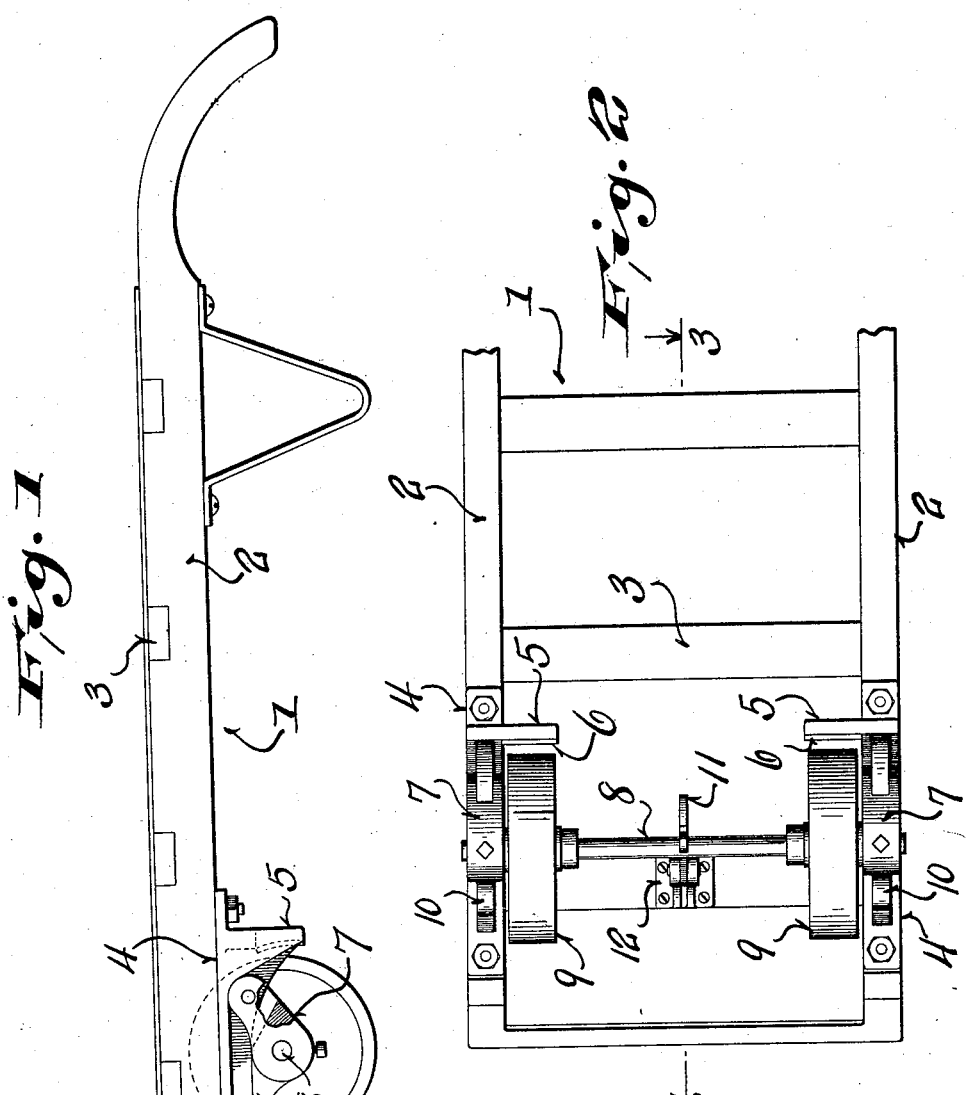

Feb. 25, 1930.                F. J. MILLER                1,748,578
                              HAND TRUCK
                         Filed May 31, 1928        2 Sheets-Sheet 2
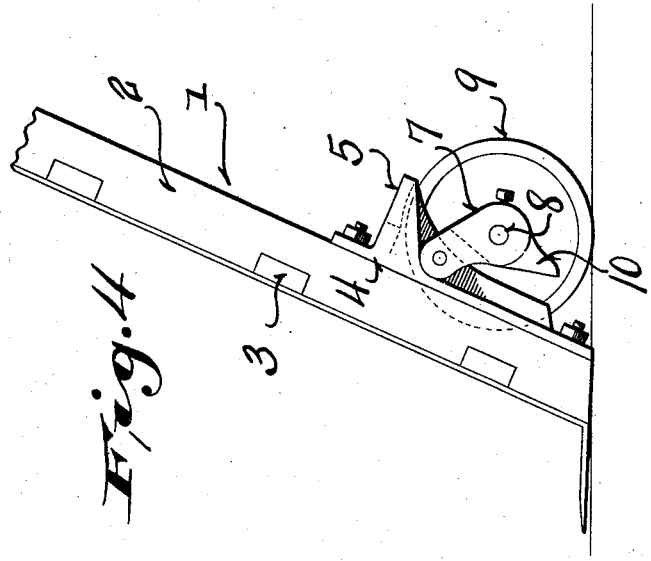
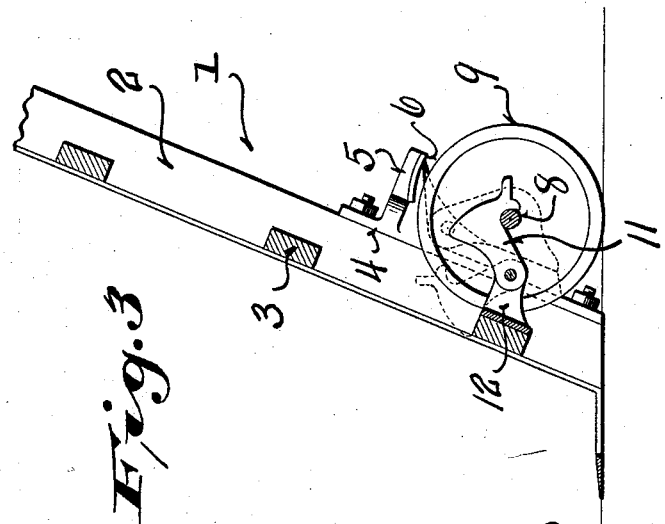

Patented Feb. 25, 1930

1,748,578

UNITED STATES PATENT OFFICE

FRED J. MILLER, OF APPLETON, WISCONSIN

HAND TRUCK

Application filed May 31, 1928. Serial No. 281,977.

This invention pertains to hand trucks of the two-wheel type, and has primarily for its object to provide means for automatically braking the wheels, as the load is picked up, and releasing the same as the truck is swung to transporting position.

Incidental to the foregoing it is a more specific object of the present invention to provide a shiftable mounting for the wheels of a truck, whereby they move into engagement with braking means carried by the truck, as the load is picked up, and free themselves as the truck is lowered to transporting position.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1 is an elevation of a truck constructed in accordance with the present invention.

Figure 2 is a bottom plan view.

Figure 3 is a longitudinal section taken on the line 3—3 of Figure 2, showing the truck in upright position, with the wheels locked in their free position, and Figure 4 is an elevation illustrating the wheels in their braking position.

Referring now more particularly to the accompanying drawings, the numeral 1 designates the conventional frame structure comprising the longitudinal side frames 2 connected by cross members 3. Secured to the side frames adjacent their forward ends are a pair of brackets 4 provided with lateral offset brake shoes 5, the braking surfaces of which are provided with the usual brake linings 6.

Pivotally connected to the brackets 4 are a pair of arms 7, the free ends of which carry the axle shaft 8, on which are mounted a pair of supporting wheels 9. In the normal transporting position of the truck the free ends of the arms 7, which are provided with the projecting lugs 10, engage the brackets 4, and serve to furnish a rigid support for the arms, thus eliminating strain and wear on their pivots.

To normally latch the wheels in their free transporting position, a dog 11 is pivotally secured to a suitable bracket 12 carried by one of the cross members 3, and is adapted to engage the axle shaft 8, to prevent swinging of the arms 7.

In practice, when a truck of this type is tilted to upright position to take up a load, the supporting wheels are utilized as fulcrums, and therefore it is essential to lock the same to prevent movement of the truck as the frame is swung downwardly.

The foregoing is accomplished by manually kicking off the dog 11, which releases the axle shaft and permits the arms 7 to swing rearwardly until the wheels engage the brake shoes 5. This action is readily accomplished in that the axle shaft is positioned slightly rearwardly of the pivots of the arms 7 when the truck is in upright position. As the frame 1 is swung downwardly to pick up the load, it is obvious that the weight of the contents of the truck will serve to force the brake shoes into positive engagement with the wheels 9 to prevent their movement. As shown in Figure 3, the dog 11 is so weighted that when the same is kicked off of the axle shaft 8, gravity will hold it in the released position shown in dotted lines.

As the truck is swung downwardly, the wheels remain in locked position until the center of the axle shaft passes forwardly of the pivot of the arms 7, after which the axle shaft will swing forwardly to its normal position, releasing the wheels from the brake shoes, and the gravity dog 11, which is then swung over center, will again engage the axle shaft 8 to latch the same in transporting position.

From the foregoing it will be seen that a very simple, inexpensive and efficient mechanism has been provided, which, when manually released, will automatically brake the wheels as the load is picked up, and thereafter release the wheels as the truck is swung to transporting position.

While the use of means for latching the wheels in their free position has been illustrated and described, it will be understood that the same is not absolutely essential to the present invention, in that the wheels will automatically shift to the desired position upon tilting or lowering the truck. However, the latch is provided to eliminate any possibility of the wheels engaging the brake shoes while the truck is being transported.

Also, while the dog 11 is illustrated and described as being released by kicking off the same with the foot, it is obvious that any manual means might be employed for releasing the dog, such as a hand lever brought to a convenient point for manipulation by the operator.

It will further be understood that while I have shown and described the axle shaft 8 as being pivotally carried by the truck frame, the salient feature of the invention is the shiftabilty of the wheels to automatically bring them into and out of engagement with the brake shoes when desired, and inasmuch as this may be accomplished by shifting the wheels in numerous ways, I do not desire the invention to be limited to the specific structure illustrated.

I claim:—

1. A hand truck comprising a frame, braking means carried by said frame, and a pair of wheels shiftably carried by said frame to engage said braking means when the frame is in upright position.

2. A hand truck comprising a frame, a pair of brake shoes carried by said frame, and a pair of wheels shiftably carried by said frame to engage said brake shoes when the frame is in upright position.

3. A hand truck comprising a frame, braking means carried by said frame, wheels shiftably carried by said frame to engage said braking means, and manually releasable means for latching said wheels against shifting in their free position.

4. A hand truck comprising a frame, a pair of supporting wheels for one end of the frame, means for automatically braking said wheels when said frame is in upright position, and manually releasable means for normally latching said wheels in free position.

5. A hand truck comprising a frame, a pair of brackets carried by said frame, brake shoes carried by said brackets, a pair of supporting wheels pivotally carried by said frame for engaging said brake shoes when said frame is tilted to vertical position, and manually releasable means for latching said wheels in their free position.

6. A hand truck comprising a frame, a pair of brackets carried by said frame, brake shoes carried by said brackets, a pair of arms pivotally carried by said brackets, and a pair of wheels carried by said arms and adapted to engage said brake shoes when said frame is tilted to upright position.

7. A hand truck comprising a frame, a pair of brackets carried by said frame, brake shoes carried by said brackets, a pair of arms pivotally carried by said brackets, an axle shaft carried by the free ends of said arms, and wheels carried by said axle shaft for engagement with said brake shoes when the said frame is tilted to upright position.

8. A hand truck comprising a frame, a pair of brackets carried by said frame, brake shoes carried by said brackets, a pair of arms pivotally carried by said brackets, an axle shaft carried by the free ends of said arms, wheels carried by said axle shaft for engagement with said brake shoes when the said frame is tilted to upright position, and manually releasable means for latching said axle shaft against shifting.

In testimony that I claim the foregoing I have hereunto set my hand at Appleton, in the county of Outagamie and State of Wisconsin.

FRED J. MILLER.